(12) United States Patent
Bartolo et al.

(10) Patent No.: US 10,731,530 B2
(45) Date of Patent: Aug. 4, 2020

(54) HEATER WITH FACILITATED HANDLING FOR THE EXHAUST GAS PURIFICATION DEVICE OF A VEHICLE

(71) Applicant: FAURECIA SYSTEMES D'ECHAPPEMENT, Nanterre (FR)

(72) Inventors: Xavier Pierre François Bartolo, Etouvans (FR); Christophe Tournier, Etouvans (FR)

(73) Assignee: FAURECIA SYSTEMS D'ECHAPPEMENT (FR)

( * ) Notice: Subject to any disclaimer, the term of this patent is extended or adjusted under 35 U.S.C. 154(b) by 0 days.

(21) Appl. No.: 16/252,860

(22) Filed: Jan. 21, 2019

(65) Prior Publication Data
US 2019/0234266 A1    Aug. 1, 2019

(30) Foreign Application Priority Data

Feb. 1, 2018    (FR) ...................... 18 50861

(51) Int. Cl.
*F01N 3/00*    (2006.01)
*F01N 3/027*    (2006.01)
(Continued)

(52) U.S. Cl.
CPC ............... *F01N 3/027* (2013.01); *F01N 3/20* (2013.01); *F01N 3/2013* (2013.01);
(Continued)

(58) Field of Classification Search
CPC .......... F01N 3/20; F01N 3/027; F01N 3/2013; F01N 13/0097; H05B 3/16
(Continued)

(56) References Cited

U.S. PATENT DOCUMENTS

| | | |
|---|---|---|
| 4,723,973 A | 2/1988 | Oyobe et al. |
| 5,672,324 A | 9/1997 | Okamoto et al. |
| (Continued) | | |

FOREIGN PATENT DOCUMENTS

| | | |
|---|---|---|
| DE | 112004001022 T5 | 6/2006 |
| DE | 102014111310 A1 | 2/2016 |
| (Continued) | | |

OTHER PUBLICATIONS

French Search Report for French Application No. 1850861, dated May 25, 2018.

*Primary Examiner* — Jason D Shanske
(74) *Attorney, Agent, or Firm* — Carlson, Gaskey & Olds, P.C.

(57) ABSTRACT

A heater is suitable to be arranged opposite and away from an upstream or downstream face of an exhaust gas purification member of a vehicle. The heater comprises a fastening ring with an electrically conductive frame having a geometric center, a central support arranged substantially at the geometric center of the frame, and a plurality of elongate heating elements each having first and second ends opposite one another. The first end is connected to the frame and the second end is connected to the central support. The fastening ring further comprises a plurality of electrically conductive radial protrusions distributed around the frame and protruding toward the outside of the frame.

9 Claims, 3 Drawing Sheets

(51) Int. Cl.
*F01N 3/20* (2006.01)
*F01N 13/00* (2010.01)
*H05B 3/06* (2006.01)

(52) U.S. Cl.
CPC ........ *F01N 13/0097* (2014.06); *F01N 3/2066* (2013.01); *F01N 2240/16* (2013.01); *H05B 3/06* (2013.01)

(58) Field of Classification Search
USPC .......................................................... 60/284
See application file for complete search history.

(56) References Cited

U.S. PATENT DOCUMENTS

| | | |
|---|---|---|
| 10,309,279 B2 * | 6/2019 | Bartolo ................. F01N 3/2013 |
| 2010/0319331 A1 | 12/2010 | Wagner et al. |
| 2014/0343747 A1 | 11/2014 | Culbertson et al. |
| 2017/0226909 A1 | 8/2017 | Hirth et al. |
| 2018/0291787 A1 * | 10/2018 | Bartolo ................. F01N 3/2882 |

FOREIGN PATENT DOCUMENTS

| | | |
|---|---|---|
| FR | 1753059 | 10/2018 |
| JP | 1986134514 | 8/1986 |
| JP | 1995259543 | 10/1995 |
| JP | 08218846 | 8/1996 |
| JP | 1997317456 | 12/1997 |
| JP | 2011247162 | 12/2011 |
| KR | 20050095676 A | 9/2005 |
| KR | 20050095676 | 5/2006 |
| WO | 2004112433 A1 | 12/2004 |
| WO | 16066551 A1 | 5/2016 |

\* cited by examiner

HEATER WITH FACILITATED HANDLING FOR THE EXHAUST GAS PURIFICATION DEVICE OF A VEHICLE

CROSS-REFERENCE TO RELATED APPLICATIONS

This application is a U.S. non-provisional application claiming the benefit of French Application No. 18 50861, filed on Feb. 1, 2018, which is incorporated herein by its entirety.

FIELD OF INVENTION

The present invention relates to a heater for an exhaust gas purification device of a vehicle, suitable for being arranged opposite and away from an upstream or downstream face of an exhaust gas purification member of a vehicle. The heater is of the type comprising a fastening ring having an electrically conductive frame having a geometric center. The heater further comprises a central support arranged substantially at the geometric center of the frame, and a plurality of elongate heating elements forming at least one layer permeable to exhaust gases, each elongate heating element having first and second ends opposite one another, with the first end connected to the frame and the second end connected to the central support.

The invention also relates to an exhaust gas purification device supply member and a vehicle exhaust gas purification device comprising such a heater.

BACKGROUND OF THE INVENTION

The exhaust lines of vehicles equipped with heat engines typically comprise catalytic purification members, for example making it possible to convert NOx, CO and hydrocarbons into $N_2$, $CO_2$ and $H_2O$. Such members are only effective when the catalytic material is at a minimum temperature.

WO2016/066551 describes a purification device in which a heater is mounted across from the upstream face of a catalyst. The heater comprises a heating wire, fixed by pins pushed into the channels of the catalyst.

Such fastening is delicate to perform at a fast pace.

Furthermore, such a system restricts the choice of the catalyst to be integrated (type of substrate, impregnation, etc.).

In this context, the invention aims to propose a heater for an exhaust gas purification device of a vehicle that is easier to manipulate, in particular easier to assemble on an exhaust gas purification device. Other aims are for the heater to be standardized and transported easily and compactly, without risk of deterioration, for it to be able to be integrated easily on any type of existing exhaust gas purification device, for it to have a very limited impact on the bulk of the exhaust line, for it to be able to be made using an automated method, and for it to allow optimal and rapid heating of the purification device.

SUMMARY OF THE INVENTION

To that end, the invention relates to a heater of the aforementioned type, wherein the fastening ring further comprises a plurality of electrically conductive radial protrusions distributed around the frame, each radial protrusion protruding from the frame in a direction opposite the geometric center of the frame.

According to specific embodiments of the invention, the heater also has one or more of the following features, considered alone or according to any technically possible combination(s):

- each elongate heating element is brazed or welded on the frame;
- the frame has an inner face oriented toward the geometric center, an outer face oriented away from the geometric center, and a plurality of through orifices each emerging in said inner and outer faces, each elongate heating element being engaged in at least one of said through orifices;
- the frame comprises an edge joining the inner face to the outer face and, for each through orifice, a slit is arranged in said edge, the slit extending from the inner face to the outer face and emerging in the through orifice;
- the through orifices comprise, for each elongate heating element, a primary orifice and two secondary orifices, the secondary orifices being close to one another and remote from the primary orifice, the secondary orifices being separated from one another by a frame portion, the first end of the elongate heating element extending through the primary orifice and forming a loop around the frame portion;
- the secondary orifices are specific to the elongate heating element, the primary orifice being shared with another elongate heating element;
- each elongate heating element is formed by a metal wire;
- the central support is made up of a washer made from a conductive material, preferably metal, for example copper, stainless steel, nickel chromium alloy or iron chromium aluminum alloy;
- the washer comprises a first large face and a second large face opposite the first large face, a plurality of piercings emerging in each of said first and second large faces, the second end of each elongate heating element being curved in a hook shape and engaged in one of said piercings;
- for each piercing, the second ends of two elongate heating elements are engaged in said piercing;
- the piercings are arranged substantially along a circle substantially centered on the center of the washer; and
- the washer is annular.

The invention also relates to a supply member for an exhaust gas purification device for a vehicle, the supply member comprising:

an enclosure made from an electrically conductive material, said enclosure having an upstream face by which the exhaust gases penetrate the supply member and a downstream face by which the exhaust gases leave the supply member; and a heater as defined above, housed in the enclosure, opposite the downstream face, the heater being mounted in said enclosure such that each radial protrusion is in contact with the enclosure.

According to specific embodiments of the invention, the supply member also has one or more of the following features, considered alone or according to any technically possible combination(s):

- the supply member comprises a power source and an electrode electrically connecting the central support to a first terminal of said power source, said electrode extending through the enclosure while being electrically isolated from said enclosure, the enclosure being electrically connected to a second terminal of the power source or the ground;

the central support is screwed, welded or brazed to the electrode; and the heater is welded, brazed or forcibly fitted in the enclosure.

The invention also relates to an exhaust gas purification device of a vehicle comprising at least one exhaust gas purification member having an upstream face by which the exhaust gases penetrate the purification member and a downstream face by which the exhaust gases leave the purification member, the purification device further comprising at least one supply member as defined above and arranged so as to cause the downstream face of the enclosure of said supply member substantially to coincide with the upstream face of the purification member.

BRIEF DESCRIPTION OF THE DRAWINGS

Other features and advantages of the invention will appear upon reading the following description, provided solely as an example and done in reference to the appended drawings, in which.

DETAILED DESCRIPTION

Figure 1:
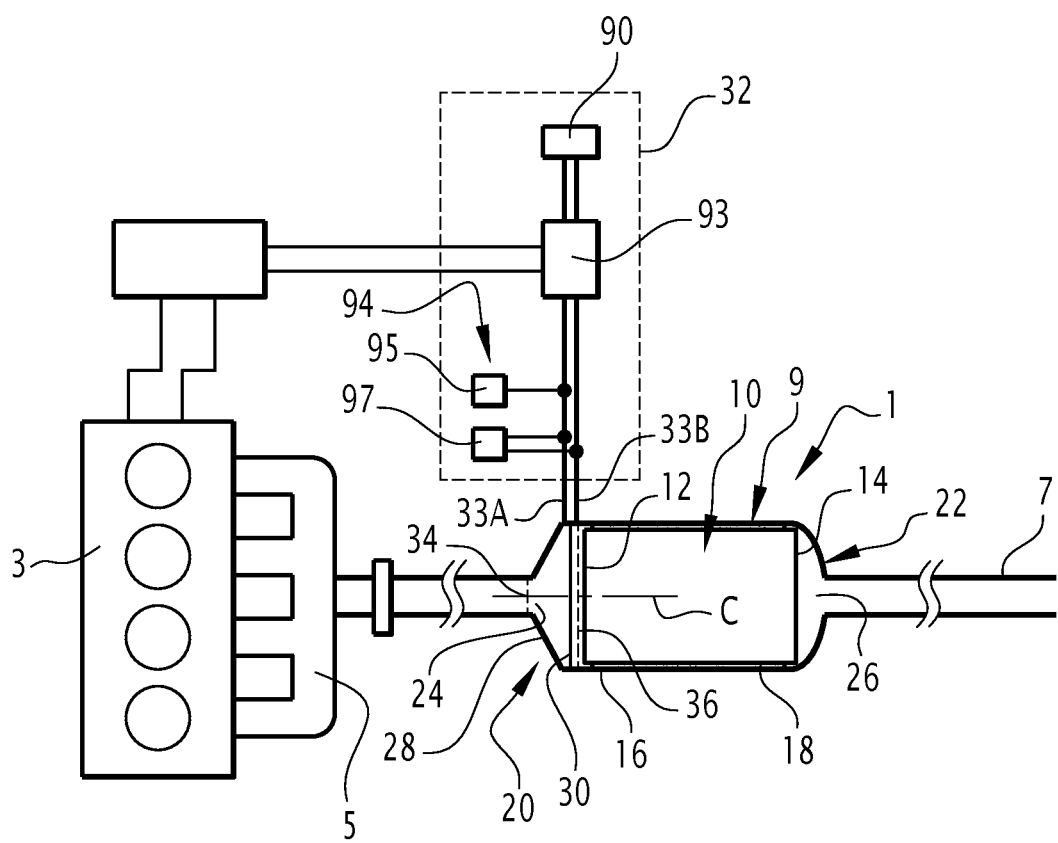
FIG. 1 is a simplified schematic illustration of a motor vehicle exhaust line incorporating an exhaust gas purification device according to the invention.

The exhaust line 1 shown in FIG. 1 is intended to be installed on board a vehicle, typically a vehicle equipped with a heat engine 3. This vehicle is typically a motor vehicle, for example a car or truck.

As shown in FIG. 1, the exhaust line 1 comprises a manifold 5 capturing the exhaust gases leaving the combustion chambers of the heat engine 3, and a nozzle 7 making it possible to release the exhaust gases into the atmosphere. The exhaust line 1 also comprises an exhaust gas purification device 9, fluidly inserted between the manifold 5 and the nozzle 7, such that the exhaust gases coming from the nozzle 7 have been purified by said purification device 9.

Said purification device 9 includes at least one exhaust gas purification member 10 having an upstream face 12 by which the exhaust gases penetrate the purification member 10, and a downstream face 14 by which the exhaust gases leave the purification member 10.

In the present description, upstream and downstream will be understood relative to the normal direction of circulation of the exhaust gases in the exhaust line 1.

The purification member 10 is, for example, an SCR catalyst, a three-way catalyst, an oxidation catalyst, a SCRF particle filter or an NOx trap. It has an axis of symmetry (not shown).

The purification device 9 also comprises a sheath 16 inside which the purification member 10 is placed, and a holding ply 18 inserted between the purification member 10 and the sheath 16.

The purification device 9 further comprises a supply member 20, for supplying the purification member 10 with the exhaust gases from the manifold 5, and a collection member 22, for collecting the purified exhaust gases leaving the purification member 10 and steering them toward the nozzle 7.

The supply member 20 is typically made up of an inlet or a mixer. It is fluidly inserted between the manifold 5 and the purification member 10, and comprises an exhaust gas inlet 24 fluidly connected to the manifold 5.

The collection member 22 typically consists of an outlet. It is fluidly inserted between the purification member 10 and the nozzle 7, and comprises an exhaust gas outlet 26 fluidly connected to the nozzle 7.

The supply member 20 more particularly comprises an enclosure 28 made from an electrically conductive material, delimiting a passage for the exhaust gases, and a heater 30 housed in the enclosure 28. The supply member 20 also comprises a power source 32 with a first terminal 33A and a second terminal 33B for supplying the heater 30 with electricity.

The enclosure 28 is electrically connected to the first terminal 33A of the power source 32, typically using an electrical connection formed by a threaded rod welded on the enclosure 28. Alternatively (not shown), the enclosure 28 is electrically connected to the ground using the same type of electrical connection.

As shown in FIG. 1, the enclosure 28 has an upstream face 34 by which the exhaust gases enter the supply member 20, and a downstream face 36 by which the exhaust gases leave the supply member 20. The enclosure 28 is suitable for guiding the gases penetrating via the upstream face 34 to the downstream face 36. The supply member 20 is arranged relative to the purification member 10 such that the downstream face 36 of the enclosure 28 substantially coincides with the upstream face 12 of the purification member 10.

The enclosure 28 is attached to the sheath 16, typically by welding, riveting or screwing.

The enclosure 28 is tubular and centered on an axis C connecting the upstream face 34 to the downstream face 36. This axis C is substantially combined with the axis of symmetry of the purification member 10.

Figure 2:
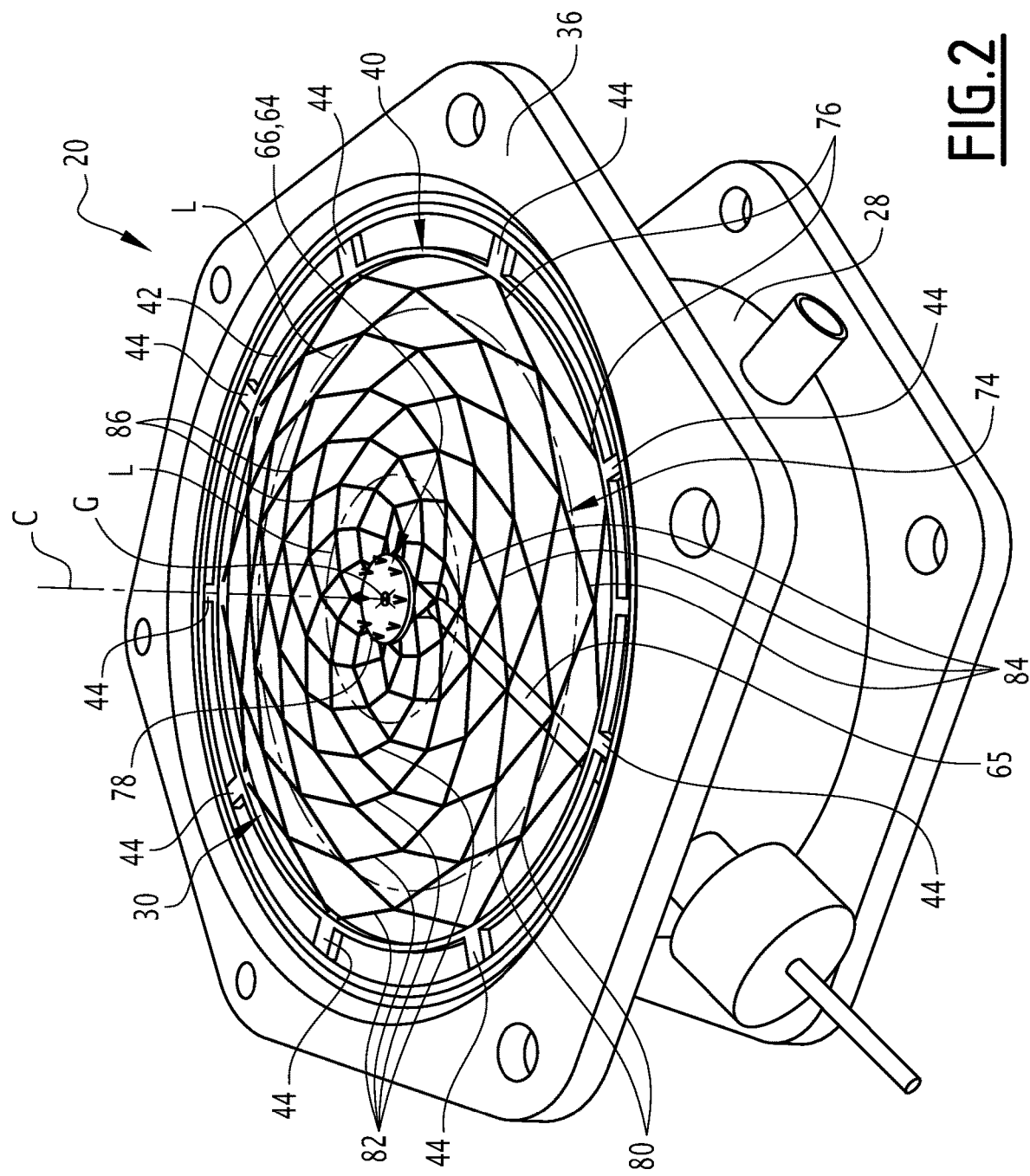
FIG. 2 is a perspective view of a supply member of a purification device of the exhaust line of FIG. 1.

As shown in FIG. 2, the enclosure 28 makes up a structural part suitable for undergoing the mechanical stresses specific to an exhaust line without deforming.

The enclosure 28 here is cylindrical of revolution. Alternatively, the enclosure 28 has polygonal section. Also alternatively, the enclosure 28 is frustoconical.

As shown in FIG. 2, the supply member 20 can also be adapted to mixing exhaust gases with an additive, such as AdBlue® in the case where the purification member 10 is of the SCR or SCRF type.

In reference to FIG. 2, the heater 30 is housed in the enclosure 28 opposite the downstream face 36, slightly withdrawn toward the inside of the supply member 20 relative to said downstream face 36. "Slightly withdrawn" means that the heater 30 is at a distance from the downstream face 36 of between 1 and 50 mm. The heater 30 is thus placed opposite and at a distance from the upstream face 12 of the purification member 10.

Alternatively (not shown), the heater 30 is housed in the enclosure 28 opposite the upstream face 34, slightly withdrawn toward the inside of the supply member 20 relative to said upstream face 34.

The heater 30 is substantially flat, i.e., it has an axial thickness of less than 20%, and preferably less than 10%, of its radial diameter.

The heater 30 comprises a fastening ring 40. This fastening ring 40 comprises an electrically conductive frame 42 having a geometric center G, and a plurality of electrically conductive radial protrusions 44 distributed around the frame 42, each radial protrusion 44 protruding from the frame 42 in a direction opposite the geometric center G of the frame 42.

The center G is substantially aligned with the axis C, i.e., the center G is at a distance from the axis C of less than 10 mm, advantageously less than 5 mm.

Figure 3:
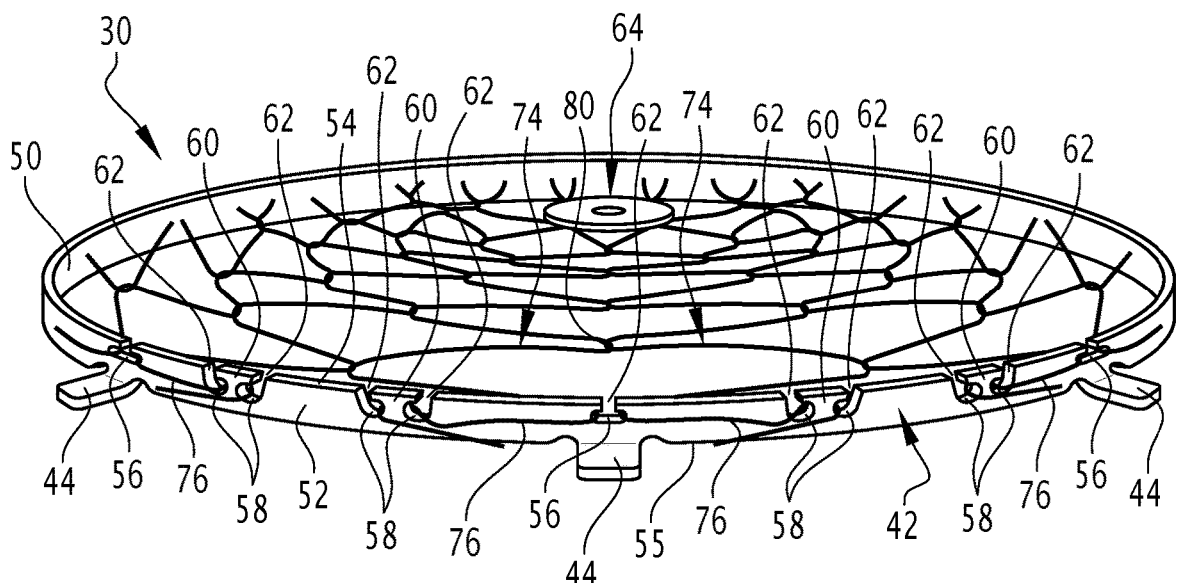
FIG. 3 is a perspective side view of a heater of the supply member of FIG. 2.

In reference to FIG. 3, the frame 42 has an inner face 50 oriented toward the geometric center G, an outer face 52 oriented away from the geometric center G, and two opposite edges 54, 55 each joining the inner face 50 to the outer face 52.

The frame 42 also has a plurality of through orifices 56, 58 each emerging in said inner and outer faces 50, 52. Said through orifices 56, 58 comprise primary orifices 56 and secondary orifices 58 distributed along the frame 42 such that, for each pair of successive primary orifices 56, four secondary orifices 58 are interposed between said primary orifices 56.

Each primary orifice 56 is substantially radially aligned with a respective radial protrusion 44.

The secondary orifices 58 are distributed in pairs, each pair being circumferentially framed by a primary orifice 56 and a secondary orifice 58, the secondary orifices 58 of a same pair being close to one another and remote from the primary orifice 56 and the secondary orifice 58 that circumferentially frame said pair.

The secondary orifices 58 of a same pair are thus separated from one another by a relatively narrow frame portion 60.

The frame 42 also has, for each through orifice 56, 58, a slit 62 is arranged in the edge 54, said slit 62 extending from the inner face 50 to the outer face 52, and emerging in the through orifice 56, 58.

For each primary orifice 56, the corresponding slit 62 is centered on said primary orifice 56. For each secondary orifice 58, the corresponding slit 62 is offset in the circumferential direction away from the secondary orifice 58 belonging to the same pair.

The frame 42 is thin, i.e., it has a thickness, taken between the edge 54 and the opposite edge 55, smaller than 10% of the diameter of the frame 42.

The frame 42 in particular has a closed contour.

Each radial protrusion 44 is advantageously integral with the frame 42. It is typically made up of a tab formed in one piece with the frame 42 and bent relative to the frame 42 so as to protrude toward the outside of the frame 42.

The fastening ring 40 is welded, brazed or forcibly fitted in the enclosure 28 such that each radial protrusion 44 is in contact with the enclosure 28. Thus, the fastening ring 40, and in particular its frame 42, is substantially at the same electric potential as the enclosure 28.

Returning to FIG. 2, the heating member 30 also comprises a central support 64 arranged substantially at the geometric center G of the frame 42.

The central support 64 has a diameter smaller than 20% of the diameter of the frame 42.

The central support 64 is electrically connected to the second terminal 33B of the power source 32 by an electrode 65 extending through the enclosure 28 while being electrically isolated from the latter. The central support 64 is in particular connected to said electrode 65 by screwing, welding, brazing, or any other appropriate means.

The electrode 65 is rigidly attached to the enclosure 28.

Figure 4:
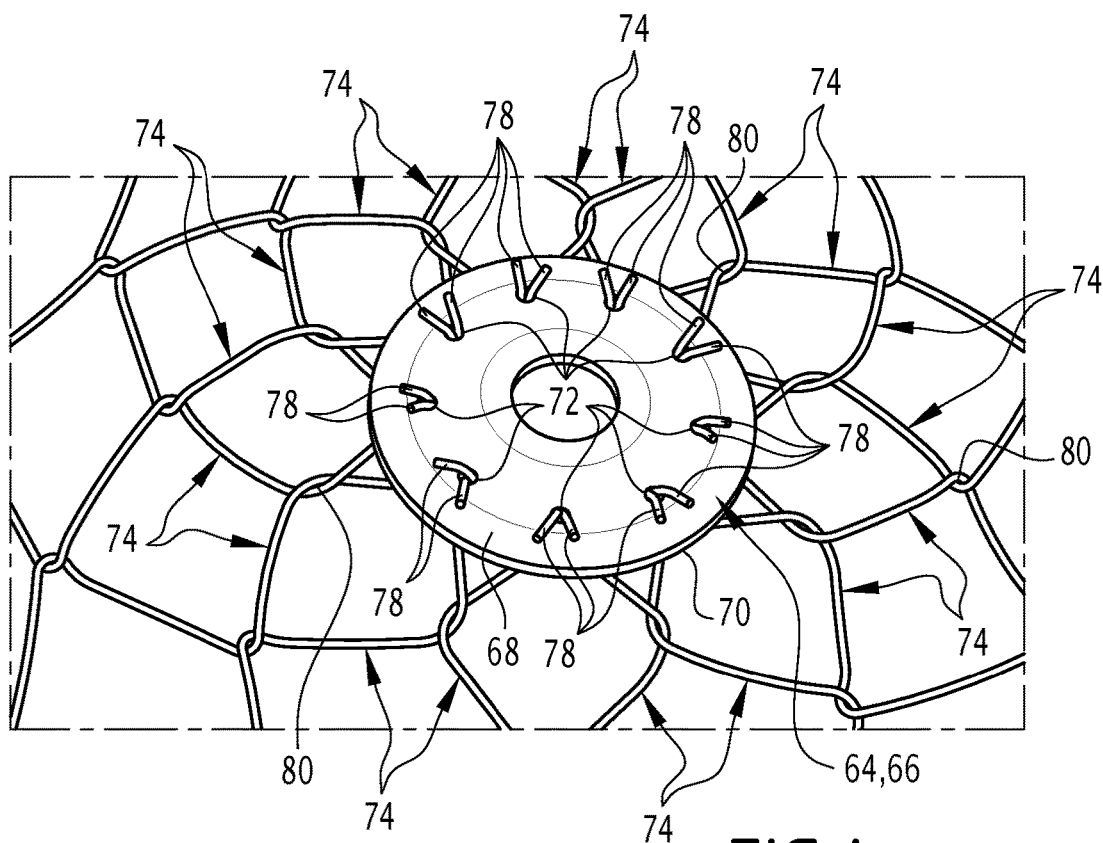
FIG. 4 is a front view of a detail of the heater of FIG. 3.

In reference to FIG. 4, the central support 64 is made up of a washer 66 made from a conductive material, preferably metal, for example copper, stainless steel, nickel chromium alloy or iron chromium aluminum alloy.

This washer 66 here is annular.

The washer 66 comprises a first large face 68 and a second large face 70 opposite one another, and a plurality of piercings 72 emerging in each of said large faces 68, 70. These piercings 72 are arranged substantially along a circle substantially centered on the center of the washer 66.

Returning to FIG. 2, the heater 30 further comprises multiple elongate heating elements 74 forming at least one layer permeable to the exhaust gases.

The elongate heating elements 74 here form a thin wafer not protruding past the frame 42 along the axis C.

Each elongate heating element 74 has a first end 76 and a second end 78 opposite one another. The first end 76 is connected to the frame 42, and the second end 78 is connected to the central support 64.

The first end 76 is thus electrically connected to the first terminal 33A of the power source 32, and the second end 78 is electrically connected to the second terminal 33B of the power source 32. As a result, when the power source 32 is active, there is a difference in electrical potential between the first end 76 and the second end 78 of each elongate heating element 74. This difference in electrical potential depends on the difference in potential between the terminals 33A, 33B of the power source 32.

In reference to FIG. 3, the first end 76 is engaged in a plurality of through orifices 56, 58 of the frame 42. Said first end 76 in particular extends through a primary orifice 56 and through the two secondary orifices 58 of a pair of secondary orifices 58 adjacent to said primary orifice 56, forming at least one loop around the frame portion 60 separating said secondary orifices 58. This arrangement makes it possible to ensure good holding of the first end 76 on the frame 42.

The secondary orifices 58 in which the first end 76 of an elongate heating element 74 is engaged are specific to said first end 76, i.e., no other elongate heating element 74 is engaged in these secondary orifices 58.

The primary orifice 56 in which the first end 76 of an elongate heating element 74 is engaged is, conversely, shared with another elongate heating element 74, the first end 76 of which is also engaged in said primary orifice 56. Said first ends 76 are nevertheless spaced apart from one another, these first ends 76 being in contact with opposite walls of the primary orifice 56.

The first end 76 of each elongate heating element 74 is also brazed or welded on the frame 42, in particular at the primary orifice 56 passed through by said first end 76. This makes it possible to strengthen the holding of this first end 76 on the frame 42 and to guarantee good electrical contact between the first end 76 and the frame 42.

In reference to FIG. 4, the second end 78 of each elongate heating element 74 is in turn curved in a hook shape and engaged in one of the piercings 72. In particular, for each piercing 72, the second ends 78 of two elongate heating elements 74 are engaged in said piercing 72. Here again, this arrangement makes it possible to ensure good holding of the elongate heating elements 74 on the central support 64.

Each elongate heating element 74 is also connected, between its first and second ends 76, 78, to at least one other of the elongate heating elements 74.

To that end, the elongate heating elements 74 are arranged, as shown in FIG. 2, according to a pattern that repeats circumferentially around the geometric center G, i.e., if one considers the axis perpendicular to the plane of the heater 30 and passing through the geometric center G, then the pattern drawn by the elongate heating elements 74 repeats with a determined period around the axis. In other words, the pattern drawn by the elongate heating elements 74 in an angular sector around the geometric center G repeats by rotation around said axis by an angle identical to that of the angular sector. In the illustrated example, the angular sector thus repeated is an angular sector of 40°, the pattern of which is therefore reproduced nine times around the geometric center G.

The elongate heating elements 74 are in contact with one another by respective points of contact 80, two points of contact 80 of two different elongate heating elements 74 in contact with one another being at the same electric potential.

Preferably, all of the points of contact 80 are arranged on a plurality of isopotential lines L, with a closed contour. Some of these lines are shown in FIG. 2. The isopotential lines L are substantially centered on the geometric center G.

For example, the isopotential lines L are circles centered on the geometric center G.

All of the points of contact 80 at a same electric potential are placed on a same isopotential line L. It is possible for some isopotential lines L to be combined.

Here, the isopotential lines L all have a mean diameter increasing when the electric potential decreases.

To allow such an arrangement, two points of contact 80 of two different elongate heating elements 74, in contact with one another, are situated along said elongate heating elements 74 at the same distance from the first respective ends 76 of said two elongate heating elements 74.

These points of contact 80 are also typically situated at the same distance from the respective second ends 78 of the two elongate heating elements 74.

As a result, it is particularly advantageous for all of the elongate heating elements 74 to have the same length taken between their respective first and second ends 76, 78.

In the illustrated example, each elongate heating element 74 occupies a respective angular sector around the geometric center G. The angular sectors occupied by the elongate heating elements 74 are adjacent to one another.

The angular sector occupied by an elongate heating element 74 is made up of half of an angular sector of the repeated pattern.

Each elongate heating element 74 is in particular arranged in a zigzag and alternatively forms the first and second segments 82, 84 connected by bends 86.

The first segments 82 extend radially toward the geometric center G and circumferentially around said geometric center G in a first direction. This first direction is clockwise in the illustration of FIG. 2.

The second segments 84 extend radially toward the geometric center G and circumferentially around said geometric center G in a second direction opposite the first. In the illustration of FIG. 2, the second direction is counterclockwise.

Two elongate heating elements 74 occupying adjacent angular sectors are connected to one another by their respective bends 86. The bends 86 therefore define the points of contact 80 between the elongate heating elements 74.

Each elongate heating element 74 is connected only to the fastening ring 40, the central support 64, and its adjacent elongate heating elements 74. This means that each elongate heating element 74 is connected only to the elements making up the heating member 30, and to none of the other elements of the purification device 9.

Each elongate heating element 74 is made up of a resistive element.

Preferably, each elongate heating element 74 has no electrically insulating coating.

Each elongate heating element 74 is suitable for being heated to a temperature of between 150 and 1300° C., preferably between 200 and 1000° C., under the effect of the different in potential applied between its first and second ends 76, 78 and the power supplied by the power source 32, so as to transmit the thermal power to the exhaust gases by convection and/or to emit in the infrared domain. Each elongate heating element 74 is also suitable for withstanding oxidation in the presence of exhaust gas. To that end, each elongate heating element 74 is typically made from a material chosen from among FeCrAl and its alloys, NiCr and its alloys, stainless steel, Inconel® or silicon carbide. For example, each elongate heating element 74 is made from Kanthal® A1, Nichrome® 80 or Nikrothal® 80.

Each elongate heating element 74 further has a straight section preferably smaller than 20 mm$^2$, more preferably of between 0.002 mm$^2$ and 10 mm$^2$, still more preferably of between 0.075 mm$^2$ and 5 mm$^2$, and still more preferably of between 0.03 mm$^2$ and 0.2 mm$^2$. For elongate heating elements 74 with a circular section, this corresponds to a diameter preferably smaller than 5 mm, more preferably between 0.05 mm and 3.5 mm, still more preferably between 0.1 mm and 2.5 mm, and still more preferably between 0.2 mm and 0.5 mm.

In the illustrated example, each elongate heating element 74 is in particular made up of a metal wire. In this case, the elongate heating elements 74 are attached to one another at their points of contact 80 by interlaced respective portions, as shown here, and/or by ligatures and/or by welding spots.

The rated operating temperature of the heater 30, as well as the total rated radiative thermal power and optionally the rated total convective thermal power of the heater 30 determine the total outer surface required for the elongate heating elements 74. This surface in turn determines the straight section of each elongate heating element 74, and the total length of the elongate heating elements 74.

The straight section of each elongate heating element 74 is in particular determined taking the characteristics of the power source 32 into account. Indeed, the electrical resistance of each elongate heating element 74 increases with the length of this heating element and decreases with its section. Each elongate heating element 74 thus has, between its first and second ends 76, 78, a length conditioned by the difference in potential applied between said first and second ends 76, 78.

For a rated electrical power of 2 kW under 12 volts, the total length of the elongate heating elements 74 is about 4 meters for elements with a section of 0.2 mm$^2$. This total length is obtained by using eighteen elongate heating elements 74, each 22 cm long.

Returning to FIG. 1, the power source 32 comprises an electrical energy source 90, for example made up of the electric battery of the vehicle, or a supercapacitor device.

The electric energy source 90 is typically suitable for providing a direct or choppy current, under a voltage depending on the vehicle (12, 48 or 400 volts, for example).

The power source 32 also comprises a controller 93 arranged to control the supply of the heater 30 with electricity.

The controller 93 for example comprises an information processing unit formed by a processor and a memory associated with the processor. Alternatively, the controller 93 is made in the form of programmable logic components, such as FPGAs (Field-Programmable Gate Arrays) or dedicated integrated circuits, such as ASICs (Application-Specific Integrated Circuit).

The controller 93 is in particular configured to choose the voltage and the electric current that are provided by the power source 32 to the heater 30, so as to keep the consumed heating power and/or electrical power within a predetermined range.

Typically, the controller 93 controls the heating by pulse width modulation (PWM).

The power source 32 further includes an acquisition member 94 that acquires the intensity of the electric current powering the linear heating elements 74 and the voltage across the terminals of the linear heating elements 74.

This member 94 is of any suitable type.

For example, the acquisition member 94 includes a sensor 95 that measures electric current and a sensor 97 that measures the electric voltage. Alternatively, the intensity of the electric current and the electric voltage are obtained by calculation, from information recovered in the controller 93.

The controller 93 is advantageously configured to control the temperature of the elongate heating elements 74, monitoring the proper operation of the elongate heating elements 74, determining the temperature of the exhaust gases when the heater 30 is no longer in use to heat the purification member 10, and determining the exhaust gas flow rate through the purification member 10, once the heater 30 is no longer in use to heat the purification member 10. To that end, the controller 93 is typically configured to carry out the control programs described in application FR 17 53059.

Owing to the invention described above, it is thus possible to manipulate the heater 30 easily, in particular to transport it without risk of deterioration and to mount it easily on an existing exhaust gas purification device, without impact on the bulk of the exhaust line.

Furthermore, the heater 30 allows optimal and fast heating of the purification device 9 according to the invention.

It will be noted that although in the description given above, the heater 30 is described positioned upstream from the purification member 10, the invention is not limited to this embodiment. Thus, in alternatives of the invention that are not shown, the heater 30 is positioned downstream from the purification member 10, or between the purification member 10 and another purification member (not shown) of the purification device 9.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A heater for an exhaust gas purification device of a vehicle, suitable for being arranged opposite and away from an upstream or downstream face of an exhaust gas purification member of a vehicle, said heater comprising:
    a fastening ring having a frame that is electrically conductive and has a geometric center;
    a central support arranged substantially at the geometric center of the frame;
    a plurality of elongate heating elements forming at least one layer permeable to exhaust gases, each elongate heating element having first and second ends opposite one another, the first end being connected to the frame and the second end being connected to the central support;
    wherein the fastening ring further comprises a plurality of electrically conductive radial protrusions distributed around the frame, each electrically conductive radial protrusion protruding from the frame in a direction opposite the geometric center of the frame, and wherein the frame has an inner face oriented toward the geometric center, an outer face oriented away from the geometric center, and a plurality of through orifices each emerging in said inner and outer faces, each elongate heating element being engaged in at least one of said plurality of through orifices.

2. The heater according to claim 1, wherein the frame comprises an edge joining the inner face to the outer face and, for each through orifice, a slit is arranged in said edge, the slit extending from the inner face to the outer face and emerging in the through orifice.

3. The heater according to claim 1, wherein the plurality of through orifices comprise, for each elongate heating element, a primary orifice and two secondary orifices, the secondary orifices being close to one another and remote from the primary orifice, the two secondary orifices being separated from one another by a frame portion, the first end of the elongate heating element extending through the primary orifice and forming a loop around the frame portion.

4. The heater according to claim 1, wherein the central support comprises a washer made from a conductive material.

5. The heater according to claim 4, wherein the washer comprises a first large face and a second large face opposite the first large face, and including a plurality of piercings emerging in each of said first and second large faces, the second end of each elongate heating element being curved in a hook shape and engaged in one of said plurality of piercings.

6. The heater according to claim 5, wherein, for each piercing, the second ends of two elongate heating elements are engaged in said piercing.

7. A supply member for an exhaust gas purification device for a vehicle, the supply member comprising:
    an enclosure made from an electrically conductive material, said enclosure having an upstream face by which the exhaust gases penetrate the supply member and a downstream face by which the exhaust gases leave the supply member, and
    the heater according to claim 1, housed in the enclosure, opposite the downstream face,
    the heater being mounted in said enclosure such that each radial protrusion is in contact with the enclosure.

8. The supply member according to claim 7, comprising a power source and an electrode electrically connecting the central support to a first terminal of said power source, said electrode extending through the enclosure while being electrically isolated from said enclosure, the enclosure being electrically connected to a second terminal of the power source or to the ground.

9. An exhaust gas purification device of a vehicle comprising
    at least one exhaust gas purification member having an upstream face by which the exhaust gases penetrate the at least one exhaust gas purification member and a downstream face by which the exhaust gases leave the at least one exhaust gas purification member, the exhaust gas purification device further comprising at least one supply member according to claim 7 arranged so as to cause the downstream face of the enclosure of said at least one supply member substantially to coincide with the upstream face of the at least one exhaust gas purification member.

* * * * *